US008131914B2

(12) United States Patent
Kruecken

(10) Patent No.: US 8,131,914 B2
(45) Date of Patent: Mar. 6, 2012

(54) ELECTRONIC DEVICE HAVING A MEMORY ELEMENT AND METHOD OF OPERATION THEREFOR

(75) Inventor: Joachim Kruecken, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 641 days.

(21) Appl. No.: 12/278,438

(22) PCT Filed: Feb. 9, 2006

(86) PCT No.: PCT/EP2006/001305
§ 371 (c)(1),
(2), (4) Date: Dec. 18, 2008

(87) PCT Pub. No.: WO2007/090432
PCT Pub. Date: Aug. 16, 2007

(65) Prior Publication Data
US 2009/0106487 A1 Apr. 23, 2009

(51) Int. Cl.
*G06F 12/00* (2006.01)
(52) U.S. Cl. .................... 711/103; 365/185.33
(58) Field of Classification Search .............. 711/103; 365/185.33
See application file for complete search history.

(56) References Cited

U.S. PATENT DOCUMENTS

| 4,099,253 | A |  | 7/1978 | Dooley, Jr. |
|---|---|---|---|---|
| 5,142,671 | A | * | 8/1992 | Ishida et al. ............ 711/119 |
| 6,904,400 | B1 | * | 6/2005 | Peri et al. ............... 703/28 |
| 7,373,452 | B2 |  | 5/2008 | Suh |
| 7,610,433 | B2 | * | 10/2009 | Randell et al. ........... 711/101 |
| 2004/0136719 | A1 | * | 7/2004 | Hidai et al. ............. 398/135 |
| 2005/0055496 | A1 | * | 3/2005 | Nallapa ................... 711/103 |
| 2005/0182893 | A1 | * | 8/2005 | Suh ......................... 711/103 |
| 2007/0143528 | A1 | * | 6/2007 | Przybylek ............... 711/103 |

FOREIGN PATENT DOCUMENTS

| EP | 0991081 A | 4/2000 |
|---|---|---|
| JP | 2003-058420 A | 2/2003 |
| JP | 2003-091993 A | 3/2003 |

OTHER PUBLICATIONS

Freescale; "EEPROM im Flash-Speicher emulieren"; www.elektronikpraxis.de/fachartikel/ep_fachartikel_2053016.html; 2005, [retrieved on Jul. 21, 2006].

* cited by examiner

*Primary Examiner* — Hashem Farrokh

(57) ABSTRACT

An electronic device comprises a processing unit operably coupled to a buffer random access memory, in turn operably coupled to a non-volatile memory configured to emulate an electrically erasable programmable read only memory. The processing unit is arranged to transfer data between the buffer RAM and the non-volatile memory at a first clock frequency. A second RAM is operably coupled between the processing unit and the non-volatile memory and the processing unit sets a Tag bit in the second RAM to identify an address in the buffer RAM that is being written to or read from by the processing unit.

20 Claims, 3 Drawing Sheets

FIG. 1 - Prior art

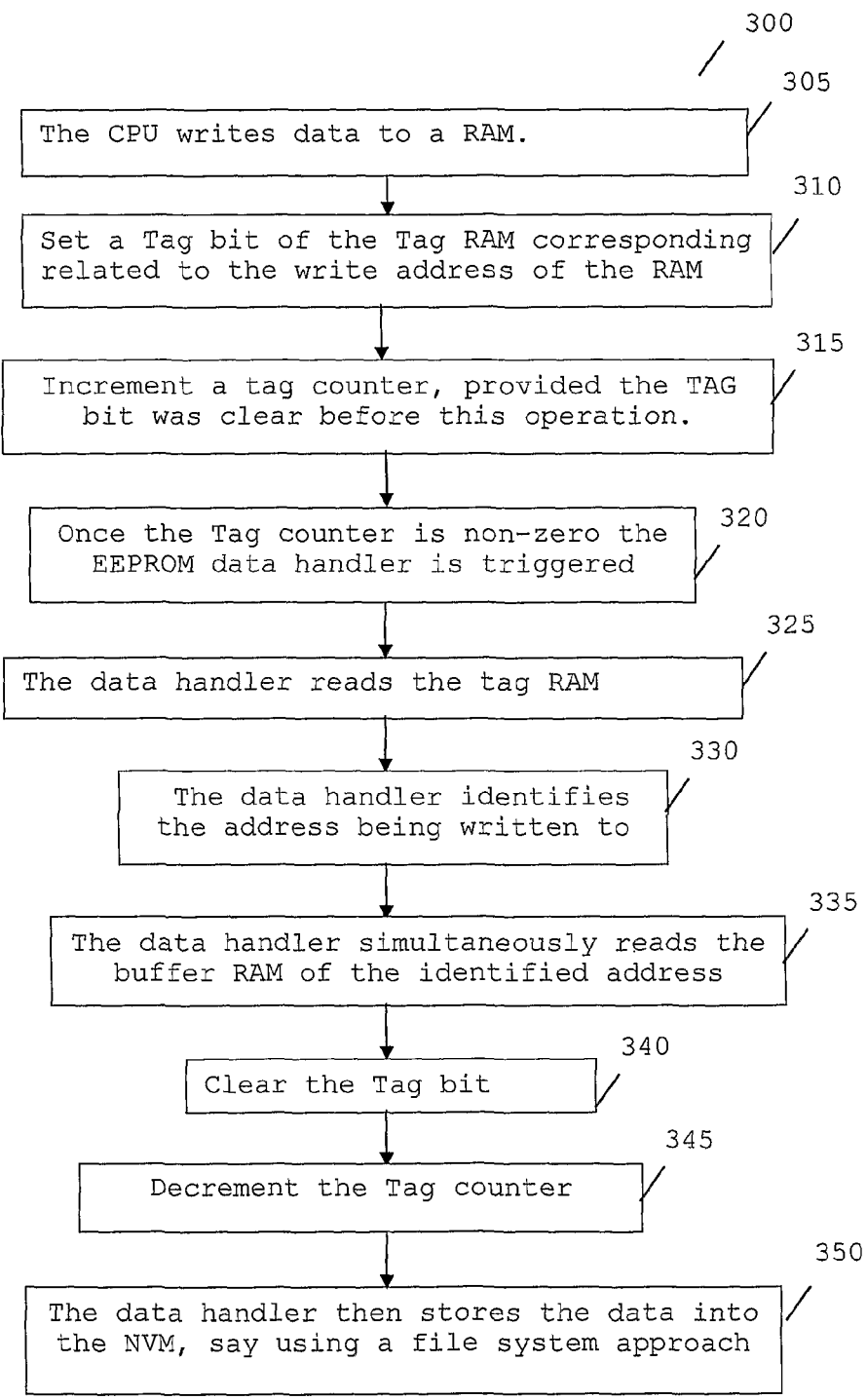

ELECTRONIC DEVICE HAVING A MEMORY ELEMENT AND METHOD OF OPERATION THEREFOR

FIELD OF THE INVENTION

Embodiments of the present invention are applicable to, but not limited to, use of random access memory in conjunction with electrically erasable programmable read only memory in an electronic device and the handling of read/write operations therefor.

BACKGROUND OF THE INVENTION

Electrically erasable programmable read only memory (EEPROM) is non-volatile memory (NVM) with a small number of individually erasable bytes (typically of the order of 8 bytes or less) that is often embedded within a micro controller. The micro controller generally also comprises a central processing unit (CPU) executing the application software. NVM requires high operational voltages, typically of the order of 10V-15V. However, the transistors used in an NVM circuit are also required to generate and route much higher voltages to the memory cells, as compared to the voltages required to operate normal logic transistors or random access memory (RAM) cells.

Thus, the relative cost of implementing NVM on an integrated circuit, otherwise referred to as a 'chip', is much higher than the costs associated with using normal logic and random access memory (RAM) circuits. This is especially the case when the number of individually erasable bytes is small, as in the case of an EEPROM. Here, the number of erasable bytes is heavily affected by these cost implications, due to the aforementioned need to provide a large number of bulky high-voltage transistors to support the NVM circuit.

To clarify this effect, it can be shown that in 0.25 μm Split-Gate-Flash (SGF) technology, a 4 KByte EEPROM (i.e. a 1024*4 byte erase sector size) requires a similar area to a large 128 KByte Flash memory block (i.e. a 128*1024 byte erase sector size). Furthermore, if this comparison is extended to 0.18 μm or 0.13 μm technologies, this effect is even greater, since the area to store one bit (bit-cell) for these technologies becomes relatively smaller than the surrounding high voltage logic.

Thus, most semiconductor manufacturers no longer provide on-chip EEPROMs. Instead, semiconductor manufacturers tend to now use Flash memory to emulate the operation of EEPROM, as shown in the process illustrated in FIG. 1.

Referring now to FIG. 1, a flowchart 100 illustrates a known operation of an EEPROM. All access to EEPROM variables is performed via an EEPROM driver subroutine, as shown in step 105. One operation of the EEPROM driver subroutine checks whether a program or erase operation is being performed by a CPU of the micro controller, as in step 110.

If a program or erase operation of a corresponding NVM is being performed by the CPU when one or more EEPROM variable(s) is/are being accessed, then the CPU determines whether the NVM allows the program or erase operation to be aborted, as shown in step 115. If the CPU determines that the NVM allows the program or erase operation to be aborted, in step 115, the program or erase operation is aborted, in step 120. The accessed variable is then read from EEPROM, as shown in step 125. Thereafter, the program or erase subroutine returns to normal operation, as in step 130.

However, if the CPU determines that the NVM does not allow the program or erase operation to be aborted, in step 115, the EEPROM variable being accessed is cached in, say, a normal (flash) random access memory (RAM) coupled to the NVM. The caching operation is typically controlled by driver software within the CPU, as shown in step 135.

In this manner, a complex EEPROM management operation is, in effect, required, and used to store data in and retrieve data from the large flash memory; the data being EEPROM variables.

A problem with this approach is that if the NVM allows the aborting of one or more program or erase operations, those operations must then be repeated. This requires additional Program/Erase cycles to be implemented by the CPU, thereby resulting in an earlier wear-out of the NVM.

Furthermore, if one or more program or erase operations cannot be aborted, either the software must wait several milliseconds until the one or more program or erase operations is/are completed or the data must be cached, thereby requiring additional RAM space. Furthermore, the caching operation itself requires valuable processing time.

A yet further problem with the known implementations is that the CPU is unable to access the flash memory for reading or writing functions if an erase operation (typically, several msec.) or program operation (typically, several μsec.) is pending.

The aforementioned problems make the handling of reading or writing operations of an EEPROM in a multi-tasking system both complex and inefficient. Thus, a need exists for an electronic device with improved EEPROM usage and method of operation therefor.

SUMMARY OF THE INVENTION

In accordance with aspects of the present invention, there is provided a memory circuit and method of operation therefor, as defined in the appended Claims.

Figure 1:
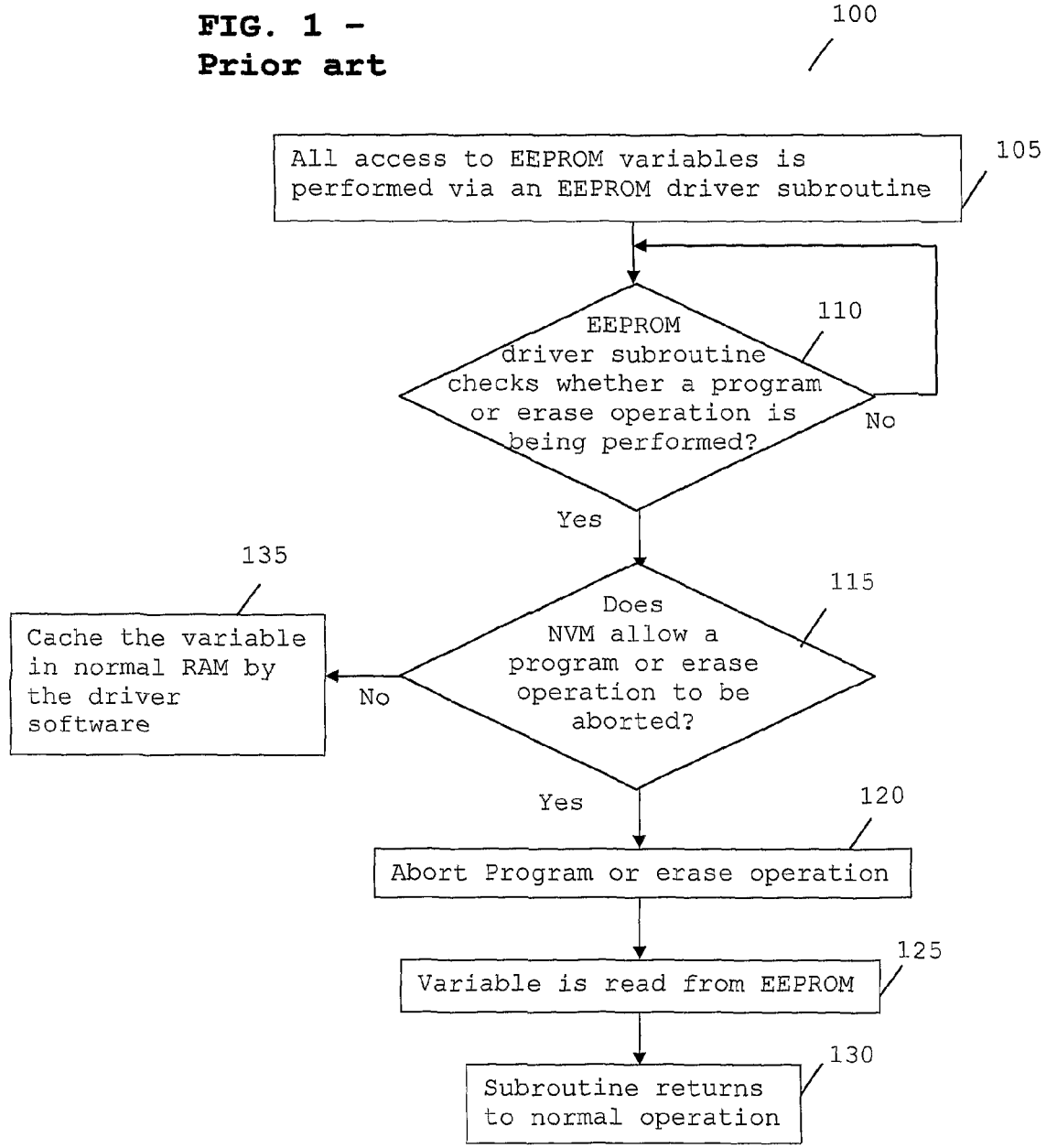
FIG. 1 illustrates a flowchart of a known operation of accessing an EEPROM operably coupled to a random access memory.
Figure 2:
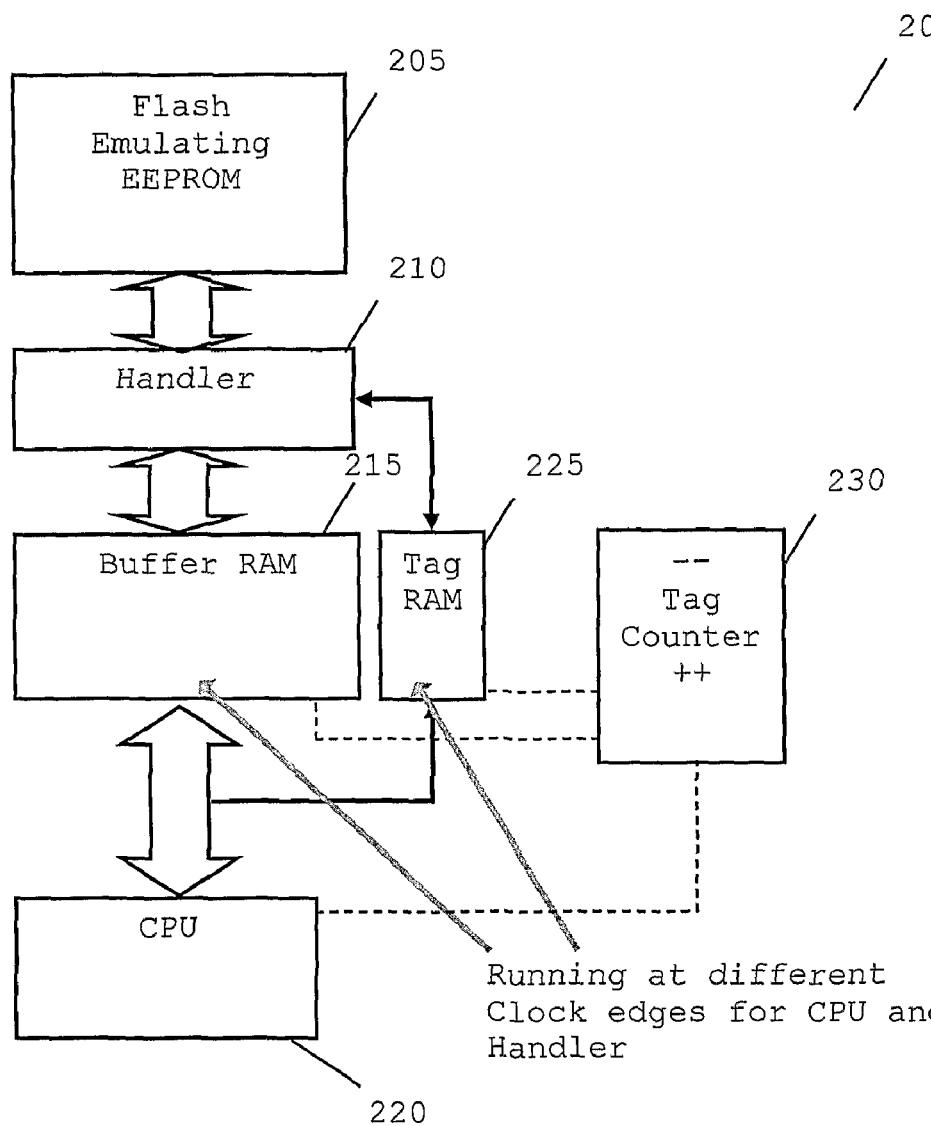

Exemplary embodiments of the present invention will now be described, by way of example only, with reference to the accompanying drawings, in which:

FIG. 2 illustrates an electronic device having a central processing unit and memory architecture adapted in accordance with one embodiment of the present invention; and FIG. 3 is a flowchart illustrating the handling of reading or writing operations in a multi-tasking system, adapted in accordance with one embodiment of the present invention.

DESCRIPTION OF EMBODIMENTS OF THE INVENTION

One embodiment of the present invention will be described in terms of a central processing unit and memory architecture arranged to perform multiple tasks simultaneously. However, it is envisaged that the inventive concept is not limited to such use. It is envisaged that the inventive concept herein described may equally be applied to any architecture that comprises stand-alone NVMs, or other storage media, which do not allow a 'read while write' operation or require a long time to store data.

In summary, the inventor of the present invention proposes a mechanism that removes the complicated task of writing EEPROM emulation software for a random access memory element. Furthermore, in one embodiment, improved performance is provided to a main central processing unit (CPU), as the CPU no longer needs to support EEPROM emulation.

In addition, in one embodiment of the present invention, transparent read and write access operations to/from the data stored in the EEPROM can be performed at any time, i.e. independent of whether a program or erase process is active for the EEPROM.

Referring now to FIG. 2, an electronic device having a memory architecture 200 is illustrated, which is adapted in accordance with one embodiment of the present invention. Memory architecture 200 comprises a central processing unit 220 operably coupled to a buffer RAM 215, which is located in a path where the CPU writes data to, and reads data from, a flash memory element 205 that is configured to emulate an electrically erasable programmable read only memory (EEPROM). The flash memory element 205 may, for example, be in the form of a non-volatile RAM. Data handling logic, hereinafter referred to as a data handler 210, is located between the buffer RAM 215 and the flash emulating EEPROM 205.

In one embodiment, the CPU 220 is also operably coupled to the data handler 210 via a Tag RAM 225. In the context of the present invention, a 'Tag RAM' encompasses a random access memory that has a '1-to-1' address relationship with the buffer RAM 215. The Tag RAM 225 is arranged such that each bit address of the Tag RAM 225 has a corresponding bit address with the buffer RAM 215. Notably, in one embodiment of the present invention, the operation of the Tag RAM 225 is arranged to run at a higher clock frequency than the buffer RAM 215. For example, in one embodiment, the Tag RAM 225 is arranged to run at twice the clock frequency of the buffer RAM 215.

Furthermore, a Tag-counter 230 is operably coupled to the buffer RAM 215 and the Tag RAM 225. In one embodiment, the Tag-counter 230 is used to track (e.g. count) a number of read/write operations of the flash emulating EEPROM 205 that have to be performed.

In operation, the memory architecture 200 is arranged to perform the following tasks. Let us first consider a 'write' operation being performed by the CPU 220. The CPU 220 writes data to the buffer RAM 215, which stores the data. In the embodiment where the Tag RAM 225 is arranged to run at twice the clock frequency of the buffer RAM 215, the address of the Tag RAM 225 that corresponds to the buffer RAM address that is being written to, is read in the first half of the buffer RAM access cycle. In the second half of the buffer RAM access cycle a logical "1" associated with the buffer RAM address is then written to the Tag RAM 225, thereby indicating that the corresponding address in the buffer RAM 215 is being written to.

Running a Tag RAM clock at twice the clock frequency of the buffer RAM 215 enables the buffer RAM access cycle to be divided into two portions. Similarly, if the Tag RAM clock was run at four times the clock frequency of the buffer RAM 215, this would enable the buffer RAM access cycle to be divided into four portions, where respective operations can be performed.

If a tag bit 'read' operation in the first cycle resulted in a logic "0" the Tag counter 230 increments its value. The Tag counter 230 is arranged to initially contain a 'zero' value. Comparison logic (not shown) is arranged to compare the Tag counter value with 'zero' to determine whether the Tag counter value is positive or negative. If a Tag bit 'read' operation in the first cycle resulted in a logic "1", the Tag counter is not incremented, since the data has not yet been read by the handler 210.

If the tag counter 230 holds a value greater than zero, the data handler 210 is notified. In response, the data handler 210 then reads the value in the corresponding address of the Tag RAM 225 and identifies the address of the buffer RAM 215 that is being written to.

The Tag RAM 225 is read by the data handler 210 in the first half of the access cycle. Once the data handler 210 identifies the corresponding address of the buffer RAM 215 that is being written to, as identified by the non-zero value in the Tag RAM, the address of the buffer RAM is read by the data handler 210. Simultaneously, the associated Tag bit at the corresponding address of the Tag RAM 225 is cleared in the second half of the cycle.

Finally, in this cycle, the Tag counter 230 is decremented, thereby indicating that one data transfer from the buffer RAM 215 to the data handler 230 has been successfully completed.

The data handler 230 then searches through the NVM memory 205 for a place to store the data that has been read from the buffer RAM 215. In one embodiment, the NVM 205 is structured in a similar manner to a file system, where each data element has an identifier (such as a file name).

The aforementioned data coherency problem of known memory architectures, for example where the CPU writes to the same address as the address that the data handler reads, is thereby avoided. This benefit is achieved, in one embodiment, by prioritizing the CPU access over the data handler 210 and making sure that any update (increment of decrement) of the Tag counter 230 occurs within a single cycle by utilising, for example, a clock frequency for the Tag RAM 225 that is twice the clock frequency of the buffer RAM 215.

Although, in one embodiment, the Tag RAM 225 is clocked at twice the frequency of the buffer RAM 215, it is envisaged that other multiple clock frequency rates may be used by the Tag RAM 225, such as four times and eight times the lower clock frequency rate of the buffer RAM 215, that would still benefit from the inventive concept herein described.

For a 'read' operation performed by the CPU 220, the data is delivered directly from the buffer RAM, and is therefore not slowed down by the slow Flash read speed or pending program or erase operations of the Flash memory.

During power-up, the data in the buffer RAM 215 is lost. Hence, in one embodiment, the data handler 210 will restore the data content in the buffer RAM 215 by copying the data content from the NVM 205 to the buffer RAM 215.

Advantageously, the use of a buffer RAM 215 adds minimal cost to the architecture, as known memory architectures are often configured to copy the data from the NVM to an internal RAM, thereby allowing fast access to the data independent of any NVM program or erase operation.

Notably, the NVM data handling is hidden from the architecture application/user, and the application/user can then rely on data in the buffer RAM as being automatically copied into (in a 'write' operation) or from (in a 'read' operation) the NVM 205. Knowledge of the structure of the file system within the NVM 205 is not required by the user, since the storage and retrieval of data is taken care of by the data handler 210.

Advantageously, this provides the semiconductor manufacturer with a further degree of flexibility, for example to increase a number of write erase cycles of the file system of the NVM. Alternatively, the additional resource resulting from using a clock frequency for the Tag RAM 225 at twice the clock frequency applied to the buffer RAM 215 may assist the NVM file system to perform additional data checking operations.

Thus, the aforementioned disadvantage in handling EEPROM operations, and especially the inefficient performing of program or erase operations relating to EEPROM emulation (typically several μsec's for program and several msec's for erase), is converted into an advantage by having a single cycle access time to the buffer RAM 215 (typically in the range of 10 nanoseconds).

From a usage perspective, in one embodiment, it is envisaged that a software developer may place a variable into the EEPROM area, for example during the linking step within the software development. In this regard, a variable can be steered by the Linker to be placed into the non-volatile storage, as would be appreciated by a skilled artisan.

Thus, since the CPU reads the data out of the RAM and stores it back to the RAM, and those operations take a single CPU cycle, there is no need to abort the program or erase operations. Furthermore, the buffering operation itself is now performed by the data handler.

Referring now to FIG. 3, a flowchart 300 illustrates an operation of writing data (as in step 305) to a non-volatile memory element emulating an operation of an EEPROM, such as flash memory 205 of FIG. 2. Notably, as will be appreciated by a skilled artisan, a similar operation applies when the CPU performs a 'read' operation, albeit that a number of the data accesses and data flow operate in the reverse direction.

A Tag bit of the Tag RAM is set that corresponds to the write address of the RAM buffer that a data bit is to be written to, as shown in step 310. A Tag counter, set initially at 'zero', is incremented, in step 315, assuming that the Tag bit address had been cleared before the 'write' operation commenced. Once the Tag counter has moved to a non-zero value, the data handler is triggered by comparison logic, as shown in step 320. The comparison logic identifies to the data handler that a 'write' (or 'read') operation has commenced due to the Tag counter having moved to a (positive) non-zero value. The data handler then reads the value from the Tag RAM in step 325, and identifies the address of the buffer RAM that is being written to, as shown in step 330.

The CPU instructs the data handler to read the buffer RAM of the identified address in step 335, and copies the data into the Flash memory that is emulating the EEPROM. Concurrently with the data handler reading the buffer RAM of the identified address in step 335, the Tag bit of the Tag RAM is cleared by the CPU in step 340 and the Tag counter is decremented to zero, in step 345.

In this manner, the aforementioned data coherency problem following the CPU writing to the same address that the data handler reads from is avoided. In one embodiment, this problem is avoided by use of the double-speed clocked Tag RAM that supports two operations within a single clock cycle applied to the buffer RAM. In this manner, when a double speed clocked Tag RAM is used, the CPU accesses the RAM on one clock edge while the data handler accesses the RAM on the other clock edge.

In one embodiment of the present invention, the data handler then stores the data into the NVM, which may be configured using a file system approach.

In one embodiment of the present invention, the circuitry is implemented in hardware, albeit that it may be supported by driver software.

In one embodiment, a file system approach is used. The file system approach only requires that the die size is able to efficiently tolerate power outages, whilst updating variables fast enough to allow 'read' and 'write' cycles. Advantageously, in this embodiment, there is a low overhead for administration bits used in managing the file system, for example a flow description out of Power-on-reset may be used to initialise the data handler to copy the NVM data to the buffer RAM. This allows the data to be read from the buffer RAM by the CPU more rapidly than directly copying the data from the EEPROM.

In one embodiment the buffer RAM acts as a fast buffer during calibration sessions. During a calibration operation, for example in the tuning of a car engine, the application/user may continuously change the data until an optimized performance is achieved. When the inventive concept of the present invention is applied to this embodiment, the continuously changing of data can be implemented rapidly out of the buffer RAM without directly writing each updated value to the NVM. Once the calibration is finished, the data content in the RAM may then be flushed at the end of the process, thereby providing a more flexible use of the non-volatile memory.

In one embodiment, it is envisaged that the amount of memory used for RAM Flash and EEPROM usage is configurable. For example, depending upon the application and use of a 4K RAM, 1K RAM may be backed-up by the Flash memory, with the remaining 3K of RAM used in a standard manner. This flexibility facilitates a much simpler and cheaper implementation of a memory-based device.

It will be understood that the improved memory circuit, and method of operation therefor, as described above, aims to provide at least one or more of the following advantages:

(i) The inventive concept can be applied to any technology. It has been found to be particularly advantageous with on-chip flash memory technology, becoming even more attractive on 0.13 μm, 90 nm and beyond. Here, the relative cost of a small sector erasable EEPROM, compared to larger sectored Flash memories as in 0.25 μm technologies, is much higher.

(ii) The inventive concept removes the complex task of writing an EEPROM emulation software routine to control the operation of the buffer RAM.

(iii) The inventive concept provides additional performance to the micro controller, since the micro controller does not need to perform the significant and time-consuming function of implementing emulation software.

(iv) The inventive concept allows transparent 'read' and 'write' access operations of the data stored in the NVM at any time, i.e. independent of whether at the same time a program or erase process is active for the NVM.

(v) The inventive concept increases reliability and improves quality of EEPROM embedded controllers.

(vi) In embodiments of the present invention, the buffer RAM is arranged to take care of the data handling. Thus, no additional storage is required for the Cache and it is therefore possible to reduce the data RAM by a significant amount.

(vii) There is a significant increase in performance (of, say, 100× faster access to EEPROM variables), as the programming of a word in Flash takes several μsec, erasing takes several msec and RAM write or read operations only take approx. 10 nsec.

In particular, it is envisaged that the aforementioned inventive concept can be applied by a semiconductor manufacturer to any CPU architecture, for example those of the Freescale™ MPU family. It is further envisaged that, for example, a semiconductor manufacturer may employ the inventive concept in a design of a stand-alone device, such as a CPU-memory architecture, or application-specific integrated circuit (ASIC) and/or any other sub-system element.

It will be appreciated that any suitable distribution of functionality between different functional units or signal processing elements such as touch sensitive devices, signal processing units, etc. may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

In particular, it is envisaged that the aforementioned inventive concept can be applied by a semiconductor manufacturer to any user interface. It is further envisaged that, for example, a semiconductor manufacturer may employ the inventive concept in a design of a stand-alone user interface for a computing device or application-specific integrated circuit (ASIC) and/or any other sub-system element.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved memory element and method of operation therefor have been described, wherein the aforementioned disadvantages with prior art arrangements have been substantially alleviated.

The invention claimed is:

1. An electronic device comprising
  a processing unit operably coupled to a buffer random access memory, in turn operably coupled to a non-volatile memory configured to emulate an electrically erasable programmable read only memory, wherein the processing unit is arranged to transfer data between the buffer RAM and the non-volatile memory at a first clock frequency; and
  a second RAM is operably coupled between the processing unit and the non-volatile memory and the processing unit sets a Tag bit in the second RAM to identify an address in the buffer RAM that is being written to or read from by the processing unit, wherein the second RAM is provided with a second clock frequency that is a multiple of the first clock frequency wherein the second RAM identifies an address of the data in the buffer RAM to be transferred to/from the non-volatile memory.

2. The electronic device of claim 1 wherein the processing unit is configured to set the Tag bit in the second RAM within a single cycle access time of the buffer RAM through use of the second clock frequency.

3. The electronic device of claim 1 further comprising data handler logic located between the buffer RAM and the non-volatile memory.

4. The electronic device of claim 3 wherein the processing unit clears the Tag bit in the second RAM when the buffer RAM is read from or written to by the data handler logic.

5. The electronic device of claim 1, by further comprising a counter operably coupled to the processing unit, the buffer RAM and the second RAM and the processing unit increments or decrements the counter to identify when a respective read or write operation is to be performed by the buffer RAM.

6. The electronic device of claim 1 wherein the processing unit operates in a real-time multi-tasking system.

7. The electronic device of claim 1 wherein the second RAM and the buffer RAM employ a one-to-one mapping between a number of addresses therein.

8. The electronic device of claim 1 wherein the second RAM and the buffer RAM employ a one-to-one mapping between substantially all of the addresses therein.

9. A method of reading data from or writing data to a non-volatile memory configured to emulate an electrically erasable programmable read only memory, via a buffer random access memory comprising:
  transferring data between the buffer RAM and the non-volatile memory at a first clock frequency;
  providing a second RAM operably coupled to the non-volatile memory;
  setting a Tag bit in the second RAM that identifies an address in the buffer RAM that is being written to or read from by the processing unit;
  providing the second RAM with a second clock frequency that is a multiple of the first clock frequency; and
  identifying, in the second RAM, an address of the data in the buffer RAM to be transferred to/from the non-volatile memory.

10. The method of claim 9 further comprising setting the Tag bit in the second RAM within a single cycle access time of the buffer RAM through use of the second clock frequency.

11. The method of claim 10 further comprising clearing the Tag bit in the second RAM in response to the buffer RAM being read from or written to.

12. The method of claim 10, further comprising incrementing or decrementing a counter operably coupled to the buffer RAM and the second RAM to identify when a respective read or write operation is to be performed by the buffer RAM.

13. The method of claim 10, further comprising employing a one-to-one mapping between a number of addresses in the second RAM and the buffer RAM.

14. The method of claim 9 further comprising clearing the Tag bit in the second RAM in response to the buffer RAM being read from or written to.

15. The method of claim 14 further comprising setting the Tag bit in the second RAM within a single cycle access time of the buffer RAM through use of the second clock frequency.

16. The method of claim 9, further comprising incrementing or decrementing a counter operably coupled to the buffer RAM and the second RAM to identify when a respective read or write operation is to be performed by the buffer RAM.

17. The method of claim 9, further comprising employing a one-to-one mapping between a number of addresses in the second RAM and the buffer RAM.

18. The method of claim 9, further comprising employing a one-to-one mapping between substantially all of the addresses between the second RAM and the buffer RAM.

19. A method of reading data from or writing data to a non-volatile memory configured to emulate an electrically erasable programmable read only memory, via a buffer random access memory comprising:
transferring data between the buffer RAM and the non-volatile memory at a first clock frequency;
providing a second RAM operably coupled to the non-volatile memory;
setting a Tag bit in the second RAM that identifies an address in the buffer RAM that is being written to or read from by the processing unit; and
setting the Tag bit in the second RAM within a single cycle access time of the buffer RAM through use of the second clock frequency.

20. The method of claim 19 further comprising clearing the Tag bit in the second RAM in response to the buffer RAM being read from or written to.

* * * * *